US011034060B2

(12) United States Patent
McKay et al.

(10) Patent No.: US 11,034,060 B2
(45) Date of Patent: Jun. 15, 2021

(54) PROCESS FOR PRODUCING A MOLDED THERMOSET COMPOSITE PART FROM UNSATURATED RESIN PREPREG SCRAP

(71) Applicant: INEOS COMPOSITES IP, LLC, Wilmington, DE (US)

(72) Inventors: Jonathan Mark McKay, Hilliard, OH (US); James William Emrick, Dublin, OH (US)

(73) Assignee: INEOS COMPOSITES IP, LLC, Wilmington, DE (US)

( * ) Notice: Subject to any disclaimer, the term of this patent is extended or adjusted under 35 U.S.C. 154(b) by 280 days.

(21) Appl. No.: 16/032,365

(22) Filed: Jul. 11, 2018

(65) Prior Publication Data

US 2019/0016016 A1 Jan. 17, 2019

Related U.S. Application Data

(60) Provisional application No. 62/531,241, filed on Jul. 11, 2017.

(51) Int. Cl.
| | | |
|---|---|---|
| B29B 17/00 | (2006.01) |
| B29C 70/50 | (2006.01) |
| B29C 43/00 | (2006.01) |
| B29B 17/04 | (2006.01) |
| C08J 11/00 | (2006.01) |
| B29C 43/02 | (2006.01) |

(Continued)

(52) U.S. Cl.
CPC ...... B29B 17/0005 (2013.01); B29B 17/0412 (2013.01); B29C 43/003 (2013.01); B29C 43/02 (2013.01); B29C 70/50 (2013.01); C08J 11/00 (2013.01); C08J 11/04 (2013.01); B29C 2043/5808 (2013.01); B29C 2043/5816 (2013.01); B29C 2793/00 (2013.01); B29K 2031/00 (2013.01); B29K 2101/10 (2013.01); B29K 2105/0872 (2013.01); B29K 2105/26 (2013.01); B29K 2307/04 (2013.01); B29K 2309/08 (2013.01); C08J 2367/06 (2013.01)

(58) Field of Classification Search
CPC .................. B29B 17/0005; B29B 17/0412
See application file for complete search history.

(56) References Cited

U.S. PATENT DOCUMENTS

| 2,628,209 A | 2/1953 | Fisk |
| 3,466,259 A | 9/1969 | Jernigan |

(Continued)

FOREIGN PATENT DOCUMENTS

WO WO2017029205 A1 2/2017

OTHER PUBLICATIONS

Nilakantan et al., "Reuse and upcycling of thermoset prepreg scrap: Case study with out-of-autoclave carbon fiber/epoxy prepreg" Journal of Composite Materials (2017) (Year: 2017).*

(Continued)

*Primary Examiner* — Nathan T Leong
(74) *Attorney, Agent, or Firm* — Thompson Hine LLP

(57) ABSTRACT

A process for preparing a composite part, the process comprising: recovering unsaturated resin prepreg scrap; combining the recovered unsaturated resin prepreg scrap with a second resinous thermosetting component; and co-molding the prepreg scrap and resinous thermosetting component together under a pressure of 25 to 4000 psi and at a temperature of 100-400° F.

12 Claims, 2 Drawing Sheets

(51) Int. Cl.

| | |
|---|---|
| *C08J 11/04* | (2006.01) |
| *B29C 43/58* | (2006.01) |
| *B29K 101/10* | (2006.01) |
| *B29K 31/00* | (2006.01) |
| *B29K 307/04* | (2006.01) |
| *B29K 309/08* | (2006.01) |
| *B29K 105/08* | (2006.01) |
| *B29K 105/26* | (2006.01) |

(56) References Cited

U.S. PATENT DOCUMENTS

| | | |
|---|---|---|
| 3,892,819 A | 7/1975 | Najvar |
| 4,182,830 A | 1/1980 | Ford, Jr. |
| 5,153,261 A | 10/1992 | Brooks |
| 5,548,059 A | 8/1996 | Bayley |
| 6,184,314 B1 | 2/2001 | Tsai |
| 2010/0267868 A1 | 10/2010 | Takahashi |

OTHER PUBLICATIONS

Hamid, G.K., "Sheet Molding Compounds: Science and Technology," Hanser Gardner Publ, New York, NY (1993).

\* cited by examiner

PROCESS FOR PRODUCING A MOLDED THERMOSET COMPOSITE PART FROM UNSATURATED RESIN PREPREG SCRAP

FIELD OF THE INVENTION

The present application relates to a process of combining scrap from an unsaturated resin prepreg with a second resinous thermosetting component, then subjecting the components to an elevated temperature and pressure in a mold to produce a thermoset composite part.

BACKGROUND OF THE INVENTION

The composites industry is constantly seeking new materials and methods to produce stronger, lighter materials. Fiber-reinforced plastics are increasingly used to meet these demands. Fiberglass and carbon fiber materials can be made into structures such as continuous fiber woven and stitched fabrics, mats, as well as chopped fiber mats. They can be treated with a formulated thermosetting resin matrix such as epoxy, vinylester, or unsaturated polyester, to make a prepreg (or pre-impregnated fiber), which is subsequently placed in a mold and cured to make a composite part. The production of these prepreg materials is often very expensive, especially when carbon fiber is used. However, the use of prepreg typically generates a significant amount of prepreg scrap, due to material left over after the desired shape has been cut, or if prepreg is stored beyond its usable life. Currently, this prepreg scrap generally ends up in a landfill, which is an unattractive option from both an environmental and an economic standpoint. Epoxy resins, as well as prepreg incorporating such resins, are typically refrigerated. If allowed to stay at room temperature, cross-linking reactions usually ensue which render the prepreg stiff, inflexible, and difficult to handle. This same thermosetting process renders the prepreg less chemically reactive to be used or recycled in other processes. Although multiple approaches for recycling epoxy prepreg have been disclosed, none fully overcomes the issues related to the instability of epoxy prepreg resins.

U.S. Patent Publication U.S. 20100267868A1 (Assigned to Toyota Motor Corp) discloses a method of recycling a fiber-reinforced plastic comprising carbon fibers and a thermosetting resin, comprising a first step of producing a harmless material by subjecting the fiber-reinforced plastic to heat treatment so as to burn the thermosetting resin and a second step of producing a recycled material during kneading of the harmless material and a thermoplastic resin.

PCT Publication WO2017/029205A1 (Assigned to Cytec Industrial Materials (Derby) limited) discloses a pattern for cutting the remnant prepreg material to form a continuous strip of the remnant prepreg material, as well as cutting the remnant prepreg material to form a continuous strip of the remnant prepreg material.

In view of the foregoing, there still exists a need in the art for an efficient method that effectively repurposes both the valuable fibers and resin of prepreg scrap to generate high mechanical properties that might otherwise be wasted.

SUMMARY OF THE OF THE INVENTION

One aspect of the present application provides a process for preparing a composite part, the process comprising: (i) recovering unsaturated resin prepreg scrap; (ii) combining the recovered unsaturated resin prepreg scrap with a second resinous thermosetting component; and (iii) co-molding the prepreg scrap and resinous thermosetting component together under a pressure of 25 to 4000 psi and at a temperature of 100-400° F.

In another aspect, the present application provides an unsaturated resin prepreg scrap comprising an unsaturated polyester resin or a vinylester resin, preferably a vinylester resin reinforced with fiberglass or carbon fiber.

Yet another aspect of the present application provides a second resinous thermosetting component comprising an unsaturated polyester resin or a vinylester resin.

Yet another aspect of the present application provides a second resinous thermosetting component comprising sheet molding compound or bulk molding compound.

Another aspect of the present application provides an unsaturated resin prepreg scrap combined with a second resinous thermosetting component in a mold in a selective manner, such that the unsaturated resin prepreg scrap reinforces portions of the finished part that undergo the greatest mechanical stress. The molding is most effective when the unsaturated resin prepreg scrap and the second resinous thermosetting compound are co-molded together under a pressure of about 25 to about 4000 psi and at a temperature of about 100 to about 400° F.

DETAILED DESCRIPTION OF THE INVENTION

Figure 1:
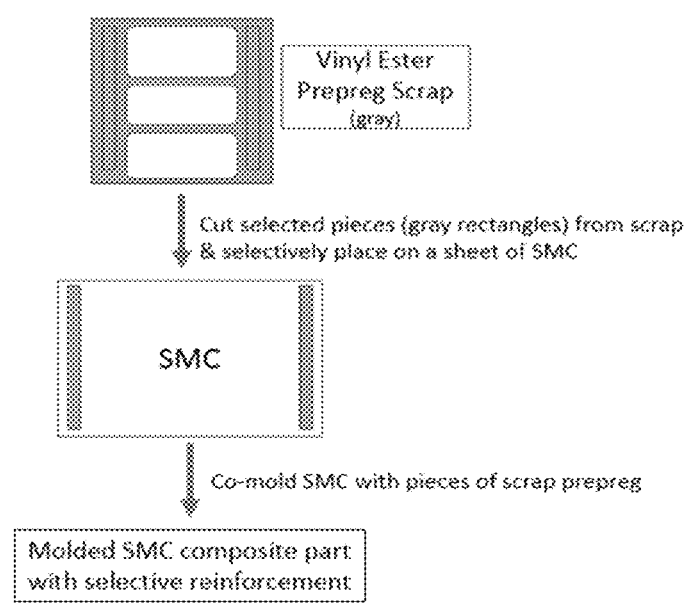
FIG. 1 is an illustration of selective reinforcement of sheet molding compound (SMC) with prepreg scrap.

The following detailed description is intended to be representative only and not limiting as to the described inventive elements. Many variations can be derived by one skilled in the art which are included within the scope of the present invention. The following detailed discussion of the various alternative and preferred embodiments will illustrate the general principles of the invention.

As utilized in accordance with the disclosure, the following terms, unless otherwise indicated, shall be understood to have the following meanings.

The term "co-molding" as used herein, refers to the molding of multiple discrete composite materials in a single mold form.

The term "composite" as used herein, refers to any combination of resinous matrix material with fibrous reinforcement. For the uses of the present application, the resinous matrix material is thermosetting in nature.

The term "prepreg" as used herein, refers to any fibrous material impregnated with a resinous matrix prior to molding.

The term "prepreg scrap" as used herein, refers to any prepreg that cannot be molded to a manufacturer's purpose. The prepreg can be cut or uncut, and can include trim, waste, off-grade material, or other prepreg recyclate.

The term "second resinous thermosetting component" as used herein, refers to any second component comprising a thermosetting resin that is combined with prepreg scrap and co-molded to form composite.

The term "sheet molding compound," as used herein, refers to any thickened, ready-to-mold, flexible sheet comprising a thermoset resin, short fibers, and optionally thickeners, additives, or fillers, to be used in compression molding to produce a fiber-reinforced composite part.

The term "bulk molding compound," as used herein, refers to any ready-to-mold, flexible compound comprising a thermoset resin, short fibers, and optionally thickeners, additives, or fillers, to be used in compression molding to produce a fiber-reinforced composite part.

The term "unsaturated resin prepreg scrap" as used herein refers to prepreg scrap comprising an unsaturated resin and a fibrous reinforcement.

The term "unsaturated polyester resin" as used herein refers to any unsaturated synthetic resins formed by the reaction of dibasic organic acids and polyhydric alcohols, typically employing maleic anhydride as one of the diacids and a reactive diluent as defined below.

The term "vinylester resin" as used herein refers to unsaturated synthetic resins formed by the reaction of an epoxy resin (including but not limited to diglycidyl ether of bisphenol-A, epoxies of the phenol-novolac type, epoxies based on tetrabromobisphenol-A, or mono-, di- or polyglycidyl ethers of any variety of aromatic, aliphatic or cycloaliphatic compounds) with (meth)acrylic acid.

Applicants have discovered that the performance of a composite part can be greatly enhanced by co-molding together unsaturated resin prepreg scrap and a second resinous thermosetting component at elevated temperature and pressure as described below.

One important embodiment of the present application discloses a process for preparing a composite part, the process comprising: (i) recovering unsaturated resin prepreg scrap; (ii) combining the recovered unsaturated resin prepreg scrap with a second resinous thermosetting component; and (iii) co-molding the prepreg scrap and resinous thermosetting component together under a pressure of about 25 to about 4000 psi and at a temperature of about 100 to about 400° F.

According to one embodiment of the present application, the unsaturated resin used in the preparation of prepreg scrap is an (i) unsaturated polyester resin or (ii) a vinylester resin.

Another embodiment of the present application discloses that an unsaturated polyester resin is treated with transesterification reagents selected from the group consisting of 2-hydroxyethyl (meth)acrylate and 2-hydroxyethyl (meth)acrylamide to give (meth)acrylate and (meth)acrylamide functionality, such as, for example, those disclosed in U.S. Pat. No. 5,548,059. As used herein, these resins are presumed to be vinylester resins. It has been observed in many composite fabrication methods, the unsaturated resin is typically diluted in a reactive diluent such as styrene or the like. Other reactive diluents are described in U.S. Pat. Nos. 6,184,314 and 3,892,819, and typically can include a wide array of mono- and polyfunctional acrylate, methacrylate, vinyl, and allyl compounds of a viscosity and reactivity suitable for the application.

According to another embodiment of the present application, the applicants' current process does not employ any reactive diluents, and control of emissions or use of these reactive diluents is not necessary for the current process, thus making the process environmentally safer and more compliant to regulatory norms of various authorities.

Unsaturated resin prepreg must have the proper tack in order to be handled and useful. One skilled in the relevant art would be familiar with common methods of ensuring that resins wet out fiber on the one hand and thicken to a useful level of tack on the other hand. Accordingly, prepregs of the present application are prepared by the hot melt route or a solution route.

According to the hot melt route, the resin is cast into a film by heating to a temperature where it will readily flow and spread evenly. Furthermore, the resin is heated to such a temperature that the thermally-activated peroxide does not appreciably decompose to initiate polymerization of the unsaturated resin. Without being limiting, unsaturated resins with a viscosity of about 4000 to about 16,000 centipoise at the casting temperature have been found to be suitable for film formation. Those skilled in the art of pre-pregging via the hot melt route will select the viscosity-time profile that is suitable for their equipment.

According to the solution route, the resin is dissolved in an inert solvent. The resin solution penetrates into the space between the fibers and then the solvent is evaporated away at an elevated temperature. The solvent and the temperature-time profile where the solvent is evaporated should be chosen such that the peroxide remains stable. Without being limiting, organic solvents used in the present application are selected from group comprising toluene, acetone, 2-propanol, methanol, 1-propanol, 2-butanone (methyl ethyl ketone), and ethyl acetate. Those skilled in the art of pre-pregging via the solution route will select the solvent and time-temperature profile that is suitable for their equipment.

Either through hot melt or solution route, the unsaturated resin increases in viscosity and decreases in tack as it cools to room temperature. Either through hot melt or solution route, the resin can be thickened further by reaction of hydroxyl groups in the resin with functional groups selected from isocyanates, reaction of carboxylic acid groups in the resin with thickeners such as magnesium oxide, calcium hydroxide magnesium hydroxide, calcium hydroxide, and the like. The resin may also be additionally thickened by reaction of polyisocyanate compounds such as methylene (bis)diisocyanate (MDI) with hydroxyl groups in the resin. Such methods have been well-described in the literature, as shown U.S. Pat. Nos. 2,628,209, 3,466,259, 4,182,830, and 5,153,261, as well as references thereto, and are incorporated as references herein. These methods are useful in thickening the prepreg to a useful level of tack.

Unsaturated resin prepregs can have good shelf stability when compared to prepreg made with other resins such as epoxy. Epoxy resin prepreg must typically be stored in a refrigerator or freezer to prevent unwanted polymerization from occurring to maintain the usability of the prepreg. Thus, scrap from epoxy resin prepreg is of limited usefulness and cannot easily be recycled or incorporated with in future processes due to both its reduced chemical reactivity and stiff, unmalleable handling. Multiple approaches for recycling epoxy prepreg have been disclosed, but none overcomes the issues related to the instability of epoxy prepreg resins.

Without wishing to be bound by theory, the use of both a well-chosen thermally-activated peroxide, coupled with free radical inhibitors such as are known in the art can limit the instability of unsaturated resin prepreg and unsaturated resin prepreg scrap relative to epoxy resin prepreg and unsaturated resin prepreg scrap.

Accordingly, the thermally-activated peroxides are well-known to one skilled in the art and can be readily chosen. An unsaturated polyester resin or a vinylester resin is used to make a composite, in presence of peroxide or a mixture of peroxides that can generate free radicals and initiate free radical curing. As described in U.S. Pat. No. 6,184,314, an accelerating agent or promoter that catalyzes the decomposition of the peroxide to generate free radicals can also be present.

The present application uses heat-activated peroxide or mixture of peroxides stable at room temperature safely blended into the vinyl ester resin prior to the preparation of a prepreg. In one embodiment of the present application, it is desirable to use a peroxide or mixture of peroxides that is stable at the temperature at which the prepreg is prepared. As per another embodiment, it is desirable to use a peroxide or a mixture of peroxides that is compatible with the analogous polymerization initiator and catalyst system present in the second resinous thermosetting component to produce a composite part. Peroxides useful in the current application include, but are not limited to, t-butyl peroxybenzoate, benzoyl peroxide, t-amyl peroxybenzoate, t-butyl peroxy 2-ethylhexanoate (t-butyl peroctoate), dicumyl peroxide, t-butyl peroxy isopropyl carbonate, cumene hydroperoxide, cyclohexanone peroxide, t-butyl peroxide, t-butyl hydroperoxide, 1,1-bis(t-butylperoxy)cyclohexane, 1,1-bis(t-butylperoxy)-3,3,5-trimethylcyclohexane, and the like, as well as mixtures thereof. Those skilled in the art of prepreg fabrication and compression molding will readily recognize other possible peroxides or combinations of peroxides suitable for the current application.

Suitable free-radical inhibitors are present or absent in either the unsaturated resin prepreg scrap or the second resinous thermosetting compound. Inhibitors useful in the present application are well-known in the art. They include 4-t-butylpyrocatechol, t-butylhydroquinone, 1,4-benzoquinone, 6-t-butyl-2,4-xylenol, 2,6-di-t-butyl-p-cresol, 2,6-di-t-butylphenol, hydroquinone, 4-methoxyphenol, phenothiazine, and the like.

Accordingly, the suitable prepreg fiber for the present application can include, but is not limited to, carbon fiber, glass fiber (fiberglass), basalt fibers, aramid fibers, natural fibers, and/or recycled fibers. The fiber used to produce the prepreg is in the form of a continuous tow, a woven fabric, a non-woven fabric, or a non-continuous mat such as a chopped strand mat. If desired, the prepreg is sliced to produce tow-preg that is used to fabricate a composite part.

Further, the unsaturated resin prepreg optionally comprises other non-limiting ingredients selected from the group consisting of fillers, calcium carbonate, mold release agents, thickeners, pigments, thermoplastic low-profile additives that enhance surface finish, density reducers such as glass microspheres, and fire-retardant additives such as aluminum trihydrate as described in U.S. Pat. No. 3,892,819.

In one embodiment of the present application, it disclosed that during fabrication of composite part by using a prepreg by consolidation in an autoclave or by compression molding, pieces of prepreg with the necessary size and shape are cut and placed in the autoclave or the press. In the process of the present application, the scrap can be collected and saved. Because the unsaturated resin prepregs used in this application exhibit excellent stability at room temperature, it is possible to combine scrap obtained from different lots of prepreg over an extended period of time.

Figure 2:
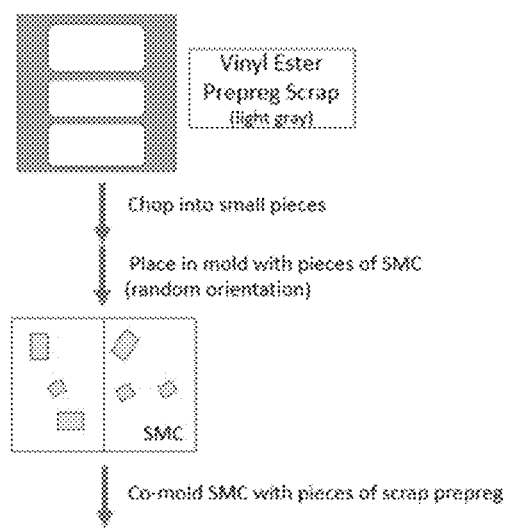
FIG. 2 is an illustration of co-molding of prepreg scrap with sheet molding compound (SMC) with a random orientation of prepreg size, shape and positioning.

In another embodiment, the present application provides a process for reusing prepreg scrap. The scrap is typically cut into smaller pieces. If the scrap is used for selective reinforcement of sheet molding compound (SMC) in areas where additional strength and/or stiffness is required, it can be cut into strips and pieces of a particular size and shape and positioned in specific positions in the mold to better support portions of the finished part that are exposed to greater mechanical stress, as depicted in FIG. 1. The pieces could also have a more random size, shape, and orientation when they are combined with the second resinous thermosetting compound, as depicted in FIG. 2. If the prepreg is sliced to produce a tow-preg, the pieces of tow-preg not used to fabricate a composite part can be collected and used similarly.

In another embodiment, this application discloses that the second resinous thermosetting compound comprises a thermosetting resin, preferably an unsaturated resin as defined above, more preferably a vinylester resin as defined above. The second resinous thermosetting component is optionally thickened by metal oxides or hydroxides reacting with acid groups in the resin, or by reaction of polyisocyanate compounds such as methylene (bis)diisocyanate (MDI) with hydroxyl groups in the resin, as described above. The resin can be reinforced with fiber or unreinforced. The second resinous thermosetting component, optionally contains other ingredients including fillers, such as calcium carbonate, mold release agents, thickeners, pigments, or thermoplastic low-profile additives that enhance surface finish, density reducers such as glass microspheres, and fire-retardant additives such as aluminum trihydrate.

Accordingly, without wishing to be bound by theory, bonding between the unsaturated resin prepreg scrap and the second resinous thermosetting component is especially effective when the second resinous thermosetting component is an unsaturated resin and thus contains unsaturated carbon-carbon double bonds. Because a scrap piece of unsaturated resin prepreg will also have unsaturated carbon-carbon double bonds remaining after prepreg production and storage, they readily react with the double bonds in the second resinous thermosetting component at the temperatures where the peroxide initiators decompose and generate free radicals. As such, the resulting composite is expected to be more homogeneous than when only mechanical integration of the scrap occurs, as fewer voids or other non-homogeneity will exist where a mechanical stress might propagate cracking or other mechanical failure. If either the prepreg scrap or the second resinous thermosetting component were to employ another matrix resin system, such as epoxy, this important similarity and synergism in chemistry and curing mechanism would not occur.

In another embodiment, the present application provides a sheet molding compound (SMC) useful as the second resinous thermosetting component. Sheet molding compound, including resins, reinforcing fiber, and additives used therein, has been well-described in the literature and is known to one skilled in the art. Sheet molding compound uses short, chopped fibers that are typically one inch or less in length. The resin itself is typically, but not necessarily, an unsaturated resin such as an unsaturated polyester resin or vinylester resin. The resin is typically thickened by metal oxides or hydroxides reacting with acid groups in the resin, or by reaction of polyisocyanate compounds such as methylene (bis)diisocyanate (MDI) with hydroxyl groups in the resin.

In another embodiment, present application provides a bulk molding compound (BMC) useful as the second resinous thermosetting component. Bulk molding compound, including resins, reinforcing fiber, and additives used therein, has been well-described in the literature and is known to one skilled in the art. Bulk molding compound bears many similarities to sheet molding compound. Accordingly, bulk molding compound uses short, chopped fibers that are typically less than one inch in length. The resin itself is typically, but not necessarily, an unsaturated resin such as an unsaturated polyester resin or vinylester resin. The resin can also be thickened by metal oxides or hydroxides reacting with acid groups in the resin, or by reaction of polyisocyanate compounds such as methylene (bis)diisocyanate (MDI) with hydroxyl groups in the resin.

In another embodiment, the present application provides a "mold" or "mold form", the terms understood to mean the foundational material on which the combined unsaturated resin prepreg scrap and second resinous thermosetting component achieve a final shape after application of temperature and pressure. The mold or mold form is made of a wide variety of materials selected from steel, chrome-plated steel, aluminum, unsaturated polyester resin, vinylester resin, and the like. The mold form is either integrated with application of temperature and pressure, (as in the case of surfaces of a matched steel tool mold form being heated by platens and closing to a final shape via hydraulic pressure), or, alternatively, it can be separate from the application of temperature and pressure, as in the example of an aluminum mold form being placed in a heated, pressurized autoclave.

A different embodiment of the present application discloses that by combining the unsaturated resin prepreg scrap and the second resinous thermosetting component in a mold form, the finished part can take on characteristics of the unsaturated resin prepreg scrap and the second resinous thermosetting component. For example, an unsaturated resinous prepreg scrap comprised of vinylester resin and carbon fiber has high mechanical properties due to the higher reinforcement quality and content relative to a second resinous thermosetting component such as sheet molding compound, whereas the second resinous thermosetting component in this instance is able to endow a part with a smooth finished surface due to the low reinforcement content and the presence especially if the sheet molding compound further comprises shrink control additives or low profile additives (such as those commonly known by one skilled in the art) that reduce the presence of fiber print and waviness that is generally ascribed to shrinkage occurring during the thermoset process. The combination of the unsaturated resin prepreg scrap and the second resinous thermosetting component can be performed in the mold form itself; or, the two components can be combined in an earlier mixing step.

Accordingly, the present application may employ a wide variety of molding processes known to one skilled in the art. Useful molding processes can include, but are not limited to, resin transfer molding, high pressure resin transfer molding, and vacuum-assisted resin transfer molding; injection molding processes such as reaction injection molding; or compression-type molding processes such as vacuum bag molding, pressure bag molding, autoclave molding, or compression molding.

For the present application, the molding process requires the application of elevated temperature to overcome the native stability of both the unsaturated resin prepreg scrap and the second resinous thermosetting component. Useful elevated temperatures for the present application can be in the range of from about 100 to about 400° F. Other suitable ranges of temperature include, but are not limited to, 200-350° F., 225-325° F. or 250-310° F. Without wishing to be bound by theory, temperatures below that range result in part production times that are not highly useful, as the polymerization proceeds relatively slowly due to the slow decomposition of the thermally-activated peroxides at those temperatures.

Accordingly, for the present application, the molding process requires the application of elevated pressure to effectively shape the forming part at the useful temperatures disclosed above. Use pressures for the co-molding of the unsaturated resin prepreg scrap and the second resinous thermosetting component are in the range of from 25-4000 psi. Other suitable pressure ranges include 50-2000 psi, 25-2000 psi. One skilled in the art will recognize that for different molding processes and equipment, different pressures are suitable for the molding of a finished part. For example, compression molding using sheet molding compound can be best performed at pressures of from 50-2000 psi, whereas resin-transfer molding can be best performed at pressures of from 500-4000 psi.

The following, non-limiting examples illustrates important aspects of the present invention.

EXAMPLES

Example 1: Preparation of Prepreg Laminate

Styrene-free, monomer free vinyl ester resin was used as the resin matrix. The resin was blended with a mixture of peroxides—1.5 parts by weight of ter-butyl peroxybenzoate and 0.25 parts by weight of tert-butylperoxy-2-ethylhecanoate were added to molten vinyl ester resin previously heated to 170° F. Resin films of this blend were cast at 170° F. on heated, 3-roll film line. Film thicknesses were controlled such that the resin content in the prepreg was 40 wt. %. The fiber employed was continuous carbon fiber whose tows were spread and wound on a spinning mandrel to a fiber areal weight of 200 g/m$^2$. Single plies of the resin film were draped onto single plies of the spread tow carbon and cut off the mandrel. This process was repeated and used to produce a laminated structure consisting of 16 alternating layers of resin and fiber. Prior to molding, the laminate was debulked under vacuum at 170° F. in a Zip-Vac unit. This step enabled resin to flow into the fiber layers.

Example 2: Recovery of Prepreg Scrap 12-inch squares of the prepreg laminate were cut and compression molded at 350° F. The pieces of prepreg that were not used to produce these compression-molded panels were collected as prepreg scrap, stored at room temperature, and used in co-molding experiments with Sheet Molding Compound (SMC) six months after they were produced.

Example 3: Preparation of Sheet Molding Compound

An SMC formulation was produced using 1-inch chopped glass. The resin was an unsaturated polyester/vinyl ester blend and was designed to produce composite parts with a Class A surface. Compression-molded composite parts were produced with SMC formulation.
Glass content of the SMC—37 weight %.
Density of SMC formulation—1.5 g/cc.

Comparative Example 1: Compression Molding of SMC Control

The tool employed for compression molding was a 12-inch square Class A tool with ½-inch shear edges. Control samples of SMC were made using 470-490 grams of compound cut from the sheet into 6-inch by 12-inch strips. Strips of SMC were stacked in the press such that a 3-inch by 12-inch area of the mold remained uncovered on either side of the stack. The SMC was pressed at 300° F. for 2 minutes with a set pressure of 75 tons. The mechanical properties of the molded SMC in the dominant direction are summarized in Table 1. The dominant direction is the direction in which more of the chopped fibers in the SMC have aligned due to flow patterns in the mold. The properties in this direction reflect the highest mechanical properties achievable with SMC.

Example A: Co-Molding of SMC with Vinyl Ester Prepreg Scrap

Test samples with SMC and prepreg were made as above with the addition of a single ply of the prepreg (approximately 30 grams) on top of a stack of SMC oriented with the unidirectional carbon fibers in the prepreg perpendicular to the 6-inch×12-inch stack of SMC in the mold. The prepreg was oriented in this fashion such that when pressed, it would allow flow of the SMC from the centered stack to the edge of the mold to be parallel to the fibers in the prepreg. The SMC was co-molded with the single ply of prepreg at 302° F. for 2 minutes with a set pressure of 75 tons. The mechanical properties of the co-molded sample in the dominant direction are summarized in Table 1. The dominant direction in this case is the direction in which the fibers of the prepreg are aligned. For testing purposes, this direction is referred to as the longitudinal direction or 0°.

TABLE 1

Mechanical properties of the molded SMC

| Property | ASTM Method | Example A | Comparative Example 1 |
|---|---|---|---|
| Tensile Strength (MPa) | D3039 | 148.9 | 50.1 |
| Tensile Modulus (GPa) | D3039 | 14.8 | 6.8 |
| Flexural Strength (MPa) | D7264 | 313.8 | 101.2 |
| Flexural Modulus (GPa) | D7264 | 19.5 | 6.3 |
| Interlaminar Shear Strength (MPa) | D2344 | 24.9 | 16.7 |
| Notched Izod (J/m) | D256 | 1724.0 | 883.0 |

Table 1 summarizes the mechanical property data obtained for the samples compression-molded in Examples 1 and 2. The data for each of the mechanical properties measured (Izod impact properties, flexural strength and modulus, and interlaminar shear strength) showed marked improvement when co-molding the sheet molding compound (second resinous thermosetting component) with unsaturated resin prepreg scrap, even when that scrap was stored for several months at ambient temperature and atmosphere.

Although the present application is shown and described with respect to certain aspects, it is obvious that various modifications will become apparent to those skilled in the art upon reading and understanding the specification and the appended claims. The present application includes all such improvements and modifications and is limited only by the scope of the claims.

What is claimed is:

1. A process for preparing a composite part, the process comprising:
   (i) recovering unsaturated resin prepreg scrap;
   (ii) combining the recovered unsaturated resin prepreg scrap with a second resinous thermosetting component comprising an unsaturated resin; and
   (iii) co-molding the prepreg scrap and resinous thermosetting component together under a pressure of 25 to 4000 psi and at a temperature of 100-400° F., wherein chemical bonding occurs between the unsaturated resin prepreg scrap and the second resinous thermosetting component comprising an unsaturated resin, resulting in an increase in homogeneity and decrease in voids in the composite part compared to mechanical integration alone.

2. The process according to claim 1, wherein the unsaturated resin prepreg scrap contains a thermally-activated peroxide.

3. The process according to claim 1, wherein the unsaturated resin prepreg scrap is vinyl ester resin prepreg scrap.

4. The process according to claim 1, wherein the unsaturated resin prepreg scrap is reinforced with carbon fiber.

5. The process according to claim 1, wherein the unsaturated resin prepreg scrap is reinforced with fiberglass.

6. The process according to claim 1, wherein the second resinous thermosetting component is sheet molding compound or bulk molding compound.

7. The process according to claim 6, wherein the sheet molding compound or bulk molding compound is reinforced with carbon fiber.

8. The process according to claim 6, wherein the sheet molding compound or bulk molding compound is reinforced with fiberglass.

9. The process according to claim 1, wherein the second resinous thermosetting component is unreinforced.

10. The process according to claim 1, wherein the co-molding is performed under a pressure of 25-4000 psi and at a temperature of 200-350° F.

11. The process according to claim 1, wherein the co-molding is performed under a pressure of 25-2000 psi and at a temperature of 250-350° F.

12. The process according to claim 1, wherein the co-molding is performed under a pressure of 500-4000 psi and at a temperature of 200-350° F.

* * * * *